United States Patent Office 3,816,399
Patented June 11, 1974

3,816,399
1-AMINE NUCLEOSIDES
Gordon Shaw, Shipley, and Noel James Cusack, Cambridge, England, assignors to The University of Bradford, Bradford, Yorkshire, England
No Drawing. Filed July 8, 1971, Ser. No. 160,944
Claims priority, application Great Britain, July 14, 1970, 34,176/70; Nov. 3, 1970, 52,219/70
Int. Cl. C07c 95/04
U.S. Cl. 260—211.5 R  12 Claims

ABSTRACT OF THE DISCLOSURE

Acid addition salts of alkylidene-furanosylamines, particularly isopropylidene-furanosylamines, pharmacologically active derivatives thereof and a method for the preparation of said salts by the reaction of a pyranosylamine with a carbonyl compound. The acid addition salts of alkylidene-furanosylamines are useful as intermediates, for example, in the production of nucleosides having antibiotic, antitumour and immunosuppressant activities.

---

This invention relates to sugar derivatives. In particular it relates to the acid addition salts of alkylidene-furanosylamines, particularly isopropylidene - furanosylamines, to pharmacologically active derivatives thereof and to a method for the preparation of said salts.

The term "alkylidene" is used herein to refer to a methylene grouping optionally substituted by one or two lower alkyl or aryl groups. In this specification, the term "lower alkyl" means an alkyl group containing from 1 to 6 carbon atoms and "aryl" refers to phenyl or substituted phenyl groups. Similarly lower alkoxy, lower alkylthio and lower alkanoyl refer respectively to alkoxy, alkylthio and alkanoyl groups containing from 1 to 6 carbon atoms.

The acid addition salts which are the subject of the present invention are useful intermediates in the production of known nucleosides, such as imidazole, pyrimidine and purine nucleosides which are recognised in the art to have antibiotic, antitumour and immunosuppressant activities.

According to the method of the present invention, the acid addition salts of mono and dialkylidene-furanosylamines are prepared by the reaction of a pyranosylamine of the formula:

$$\begin{array}{c} \diagup CHR_1-O \diagdown \\ CHOH \quad\quad CR_3NR_4R_5 \\ \diagdown CHOH-CHR_2 \diagup \end{array}$$

Formula I wherein $R_1$ represents hydrogen, methyl or hydroxymethyl; $R_2$ represents hydrogen, amino or hydroxyl; $R_3$ represents hydrogen or hydroxymethyl; and $R_4$ and $R_5$ represent hydrogen, lower alkyl or aryl but are preferably both hydrogen; and such that, in the furanose form, it possesses at least one pair of 1,2 cis or 1,3 cis hydroxyls with a carbonyl compound of the formula:

$$\begin{array}{c} R_6 \diagdown \\ \quad\quad C=O \\ R_7 \diagup \end{array}$$

wherein $R_6$ and $R_7$, which may be the same or different, each represent hydrogen, lower alkyl or aryl or may together with the carbonyl group form an alicyclic ketone, in the presence of sufficient strong acid such as hydrochloric, sulphuric or p-toluenesulphonic acid to ensure that the amino group remains protonated. Preferably both $R_6$ and $R_7$ are methyl.

Compounds which may be produced by the method of the invention include those of formulae II to VII as set out herebelow:

FORMULA II

FORMULA III

FORMULA IV

FORMULA V

FORMULA VI

FORMULA VII wherein $R_1$, $R_2$, $R_3$, $R_4$, $R_5$, $R_6$ and $R_7$ have the same significance as in Formula I and X is an anion such as chloride, sulphate or p-toluenesulphonate.

The compound of the formula II is formed when, in the compound of formula I, $R_1$ is hydroxymethyl (as in glucosylamine), the compound of formula IV when $R_2$ is hydroxyl and is cis to the hydroxy group on the adjacent carbon atom (as in ribosylamine) and, when both these conditions are satisfied (as in mannosylamine) the compound of formula III may be formed. When, in the compound of formula I, $R_1$ is not hydroxymethyl, $R_2$ is hydrogen or hydroxyl but trans to the hydroxyl on the adjacent carbon atom and the hydroxyls on carbons number 3 and 5 are cis to one another (as in 2-desoxyriboslyl-amine or xylosylamine) then the compound of formula V may be formed; when $R_3$ is hydroxymethyl and $R_2$ is hydroxyl but trans to the hydroxyl on the adjacent carbon atom and cis to the hydroxyl of the $R_3$ hydroxymethyl (as in fructose) then the compound of formula VI may be formed; and when both of these conditions are satisfied (as in sorbose) then the compound of formula VII may be formed.

Particularly useful compounds which may be prepared by the method of the present invention are the salts of 2,3-O-isopropylidene-β-D-ribofuranosylamine, of 5,6-O-isopropylidene-β-D-glucofuranosylamine and 2,3 - 0-5,6-O - diisopropylidene - α-D-mannofuranosylamine. It will be seen that the configuration of the amino group in these 2,3-O-isopropylidene compounds is generally trans to that isopropylidene group.

The method of the present invention may be modified, and preferably is so modified, by the addition to the reaction mixture of a substance which, by removing as it is formed the water resulting from the condensation of the carbonyl compound and the pyranosylamine, prevents hydrolysis of the alkylidene group or of the amino group.

A substance which may very conveniently be employed in this way is 2,2-dimethoxypropane.

The method of the invention is in most cases conveniently carried out by stirring the reaction mixture at about 20° C. for about 12 hours. The addition salt product precipitates or is precipitated from the solution e.g. by the addition of ether and then recovered by filtration.

A particularly suitable acid for use in the method of the invention is p-toluenesulphonic acid since this is a solid which is consequently easy to handle in the dry monohydrate form.

As stated above, the compounds of the present invention are particularly useful in the synthesis of previously known or other nucleosides, and this will now be illustrated with reference to formulae VIII to XVII which are set out herebelow:

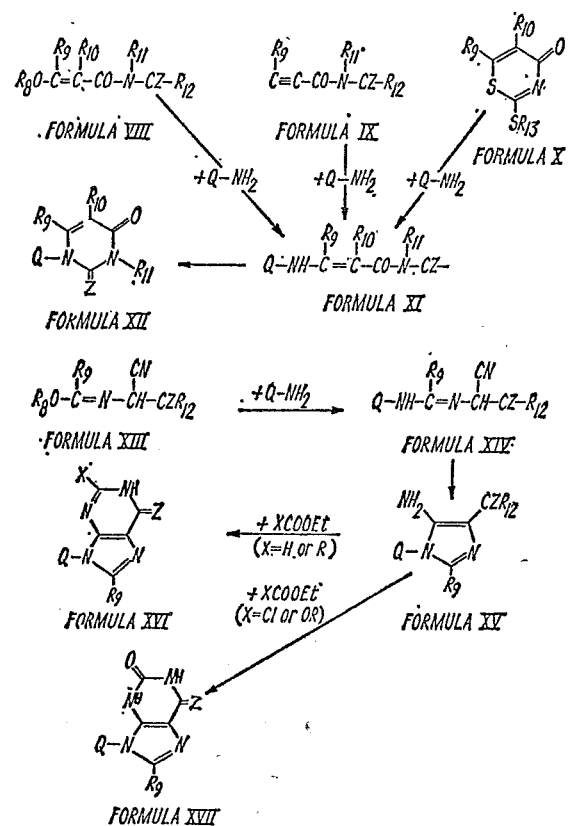

wherein $QNH_2$ represents any of the compounds of formulae II to VII ($R_4$ and $R_5$ both being hydrogen); $R_8$, $R_9$ and $R_{11}$ which may be the same or different represent hydrogen, lower alkyl or aryl; $R_{10}$ represents hydrogen, lower alkyl or an electron withdrawing group such as nitrile, carballoxy, lower alkylsulphonyl or arylsulphonyl; $R_{12}$ represents lower alkoxy, lower alkylthio, acylamino e.g. lower alkanoylamino or benzoylamino or thioacylamino e.g. thio lower alkanoylamino or thiobenzoylamino; $R_{13}$ represents lower alkyl; and Z represents oxygen or sulphur. Reaction of $QNH_2$ with any one of the compounds of formulae VIII, IX or X results in the compound of formula XI which spontaneously or under the action of heat and/or a base yields the uracil of formula XII. When $R_{10}$ is carbalkoxy e.g. carbethoxy, the compounds of formula XI or XII may be hydrolysed to the corresponding compound of formula XII wherein $R_{10}$ is a carboxylic acid group which may, in turn be readily decarboxylated to the compound of formula XII wherein $R_{10}$ is hydrogen. It will be understood that when the compounds of formulae IX and X are used as starting materials, the possibilities for $R_{10}$, $R_{11}$ and $R_{12}$ in the compounds of formula XI and XII are correspondingly restricted. Reaction of $QNH_2$ with a compound of formula XIII leads to the compound of formula XIV which, in turn forms or can easily be induced to form the imidazole of formula XV, further reaction of which by methods well known to the art with a suitable ring closing compound e.g. XCOOEt yields, when X is hydrogen or alkyl, the hypoxanthine of formula XVI, and, when X is chloro or alkoxy, a xanthine of formula XVII. These compounds may in turn be used for the production of adenosine and its congeners.

A number of the compounds which may be synthesised as described in the preceding paragraph, for example adenosine, uracil and their congeners possess antineoplastic, antibiotic and herbicidal activities.

The compounds of formulae II to VII may also be used for the production of peptides which are very useful intermediates in biosynthesis. Thus reaction of $QNHR_4$ with a suitable derivative of glycine e.g. the anhydride, an ester or an N-acyl derivative such as hippuric acid or its esters or with glycine itself in the presence of a suitable activating agent yields the compound of formula:

Formula XVIII wherein $R_{14}$ is hydrogen or an acyl group. This compound can be further treated by known synthetic methods under the appropriate conditions with glycine or another aminoacid or their derivatives to give a peptide.

The compound $QNHR_4$ may also be reacted with 6-chloropurines to form 6-glycosylamino-purines, which compounds possess antibiotic activity.

A further utility of compounds II to VII is that the group $NR_4R_5$ can be readily removed by hydrolysis under conditions which do not remove the alkylidene group or groups, to give the corresponding mono and dialkylidene-glycofuranoses. This property may also be made use of, for example, to obtain 2,3-O-acetylglucofuranose by acetylation of 5,6-O-isopropylidene-β-D-glucofuranosylamine followed by hydrolytic removal of both the amino group and the isopropylidene group. In the case of the compounds of formula II or III the sugar derivative containing one less carbon atom may be obtained directly (after first in the case of formula II protecting any free hydroxyl groups) by periodate oxidation, followed by hydrogenation. This may be carried out after formation of the nucleoside e.g. as illustrated in Formulae XIX to XXI herebelow for the production of a xylosyluracil from a glucosyluracil:

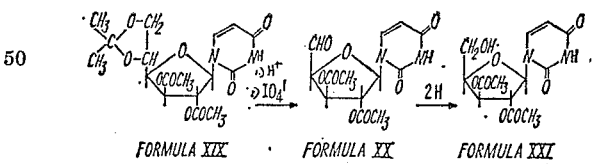

The outstanding advantage of the method of the present invention over prior art methods e.g. when used as a part of a synthetic route to nucleosides is that of great simplicity and time saving coupled with a very great increase in yield. For example, an overall yield of about 60% may be achieved for the synthesis from ribose of compounds of the type illustrated by formulae XII or XV by way of compounds of the type of formulae I, IV and VIII, IX and XI or XIII and XIV. This compares with a yield of, at best, about 20–25% obtainable by the best prior art route which also involves many more synthetic stages.

The invention is illustrated but in no way limited by the following examples:

EXAMPLE I

D-ribopyranosylamine (40.8 g.) prepared from treatment of D-ribose in saturated methanolic ammonia at 15° C., was stirred as a suspension in acetone (1000 ml.) in which was dissolved dry p-toluenesulphonic acid monohydrate (105 g.) and 2,2-dimethoxypropane (229 g.).

After 12 hours at 20° C., a clear solution was obtained which was evaporated under vacuum to half its volume. An equal volume of ether was added giving a turbid solution which, on further standing yielded, as colourless crystals, 2,3-O-isopropylidene-β-D-ribofuranosylamine p-toluene sulphonate (79 g.), M.P. 138–139° C. (dec.), $(\alpha)_D^{25}$ −19.4 (c.=1 in dimethylsulphoxide).

EXAMPLE II

To a solution in methanol (10 ml.) of 2,3-O-isopropylidene-β-D-ribofuranosylamine p-toluene sulphonate (1.08 g.) as prepared by the method of example I was added 2 N methanolic sodium methoxide (1.5 ml.) and then N-ethoxycarbonyl-α-cyano-β-ethoxyacrylamide (0.64 g.). After one hour at 20° C., a further quantity (1.5 ml.) of 2 N sodium methoxide was added and the mixture left overnight at 20° C. From this reaction mixture was isolated 3-(2′,3′ - O - isopropylidene-β-D-ribofuranosyl)-5-cyanouracil (0.7 g.), M.P. 218–220° C. which, on hydrolysis with acid gave 0.6 g. of 3-(β-D-ribofuranosyl)-5-cyanouracil, M.P. 185° C. (dec.).

EXAMPLE III

D-mannosylamine monohydrate (59.2 g.), which was prepared from mannose by treatment with saturated methanolic ammonia at 15° C., was added to a stirred solution of dry p-toluenesulphonic acid monohydrate (114 g.) in acetone (1500 ml.) which also contained 2,2-dimethoxypropane (275 g.). Solution occurred after 15 minutes and, after leaving overnight at 15° C., the toluene was halved by vacuum evaporation. To the concentrated solution was added an equal volume of dry ether and, on standing at 15° C., there rapidly separated in the form of analytically pure crystals, which were filtered off, washed with ether, and dried under vacuum, 2,3-5,6-di-O-isopropylidene-α-D-mannofuranosylamine p-toluenesulphonate (104 g.), M.P. 132–134° C. (dec.).

EXAMPLE IV

To a solution in methanol (200 ml.) of 2,3,5,6-di-O-isopropylidene-α-D-mannofuranosylamine - p - toluenesulphone (21.6 g.) as prepared by the method of example III was added 2 N methanolic sodium methoxide (25 ml.) and then α-cyano-β-ethoxy-N-ethoxycarbonyl acrylamide (10.6 g.). After one hour at 15° C., a further quantity (25 ml.) of 2 methanolic sodium methoxide was added and the mixture left overnight at 15° C. The solution was then evaporated under vacuum to dryness, the residue dissolved in water (100 ml.), cooled to 0° C. and the pH adjusted to 6 with 5 N hydrochloric acid. The resultant precipitate of di - isopropylidene - mannofuranosyl-cyanouracil (20 g.) was filtered off, dried and recrystallised from benzene/cyclohexane as colourless microprisms (3.8 g.), M.P. 80–85° C. A suspension of this product (3.8 g.) was kept for 5 hours in hot water (90° C.) at a pH of 3 when a clear solution was obtained which on evaporation to dryness and recrystallisation from aqueous methanol yielded α-D-mannofuranosyl-5-cyanouracil (1 g.) as colourless needles, M.P. 218° C. (dec.).

EXAMPLE V

D-glucosylamine (20 g.) was added to a vigorously stirred solution in acetone (75 ml.) and dimethoxypropane (75 ml.) of p-toluenesulphonic acid monohydrate (31 g.) at 15° C. and solution occurred after about 15 minutes. After a further 15 minutes a crystalline precipitate was formed which was filtered off and washed with ether to give analytically pure 5,6-O-isopropylidene-β-D-glucofuranosylamine p-toluenesulphonate (10 g.), M.P. 129° C. (dec.).

EXAMPLE VI

Solutions of ethyl N-(α-cyano - N - methoxycarbonylmethyl)formimidate (0.95 g.) in methyl cyanide (30 ml.) and of 2,3-O-isopropylidene - β - D - ribofuranosylamine p-toluenesulphonate (1.96 g.) and 2 N methanolic sodium methoxide (2.74 ml.), in methyl cyanide (20 ml.) were mixed and left to stand overnight at 15° C. Vacuum evaporation to dryness and extraction of the residue with hot chloroform gave a solution which was washed with dilute aqueous alkali, dried and evaporated to yield, on crystallisation from ethyl acetate, colourless needles of methyl 5 - amino-1-(2′,3′-O-isopropylidene-β-D-ribofuranosyl)imidazole 4-carboxylate (0.9 g.), M.P. 161° C.

This compound (0.9 g.) was dissolved in aqueous ammonia (100 ml.), the solution maintained at 78–80° C. for 15 hours and then evaporated under vacuum to give a residue which was treated with formic acid (15 ml.) and acetic anhydride (7.5 ml.) at 35° C. for two hours. Vacuum evaporation gave a residue which was heated with potassium hydrogen carbonate at 70° C. for two hours, then acidified with acetic acid and heated for a further three hours at 100° C. on a water bath. Vacuum evaporation of this solution and extraction of the residue with ethanol gave an extract from which was isolated inosine. Crystallisation from 80% aqueous ethanol gave needles of inosine (0.6 g.), M.P. 218° C. (dec.).

EXAMPLE VII

D-xylopyranosylamine (5 g.) was added to a stirred solution of p-toluenesulphonic acid (10 g.) in acetone (30 ml.) and 2,2-dimethoxypropane (30 ml.) at 20° C. Solution occurred after a few minutes and after about 5 minutes a crystalline precipitate appeared. After 10 minutes this precipitate was collected by filtration, washed twice with acetone and ether and dried under vacuum at 20° C. to yield analytically pure 3,5-O-isopropylidene-1-β-D-xylofuranosylamine p-toluenesulphonate (6.5 g.), M.P. 121° C. (dec.).

EXAMPLE VIII

To a solution of 3,5 - O - isopropylidene-1-β-D-xylofuranosylamine p-toluenesulphonate (3.61 g.) in methanol (25 ml.) at 20° C. was added 2 N methanolic sodium methoxide (15 ml.) and then α-cyano-β-ethoxy-N-methyl-N-ethoxycarbonylacrylamide (2.26 g.). A crystalline precipitate rapidly formed from which was obtained as colourless needles, on recrystallisation from methanol, analytically pure 5-cyano-3-methyl-1-(3′,5′-O-isopropylidene-β-O-xylofuranosyl)-uracil (2 g.), M.P. 220–222° C.

This product was heated with 75% aqueous acetic acid for 3 hours. Recrytallisation from aqueous ethanol of the residue obtained by evaporation to dryness gave needles of 5-cyano - 3 - methyl-1β-D-xylofuranosyluracil (1 g.), M.P. 194–197° C., $[\alpha]_D^{20}$ −72° (c., 0.5 in water).

EXAMPLE IX

L-rhamnopyranosylamine (5 g.) and p-toluenesulphonic acid (8 g.) were dissolved in acetone (25 ml.) and dimethoxypropane (25 ml.). The solution was treated with ether to turbidity and set aside overnight when an oil separated. This was stirred for a few hours when it crystallised yielding analytically pure 2,3-O-isopropylidene-α-L-rhamnofuranosylamine p-toluenesulphonate 3.7 g.), M.P. 143° (decomp.), $(\alpha)_{578+13.6}^{20}$ (c. 0.1 in dimethylsulphoxide).

EXAMPLE X 2,3 - O - isopropylidene - α - L - rhamnofuranosylamine p-toluene sulphonate (0.37 g.) with α-cayno-β-ethoxy-N-ethoxycarbonyl-N-methylacrylamide (0.23 g.) and 2% sodium methoxide in methanol (3 ml.) and methanol (2 ml.) was set aside overnight then cooled to give a crystalline precipitate of 2,3-O-isocproylidene-5-cyano-3-methyl-1 - α - L - rhamnofuranosyluracil (0.32 g.), recrystallised from methanol as needles, M.P. 272° $(\alpha)_{578}^{20}$ −67° (c., 0.2 in water).

The latter compound (2 g.) was heated with 30% aqueous acetic acid for three hours on a steam bath. Evaporation of the solution gave 5-cyano - 3 - methyl-1-α-L-rhamnofuranosyluracil (1.8 g.) which crystallised from ethanol, M.P. 242° (decomp.), $(\alpha)_{578}^{20}$ —86.5° (c., 0.1 in water).

EXAMPLE XI 5,6-O-isopropylidene-β-D-glucofuranosylamine p - toluenesulphonate (25.45 g.), α - cyano-β-ethoxy-N-ethoxycarbonyl-N-methylacrylamine (14.25 g.) and methanol (15 ml.) were mixed then treated with 2% sodium methoxide in methanol (72.5 ml.). The mixture was heated on a steam bath for ten minutes and then evaporated in vacuo to a foam. This was shaken with methylene dichloride-methanol (96:4, 60 ml.), the mixture filtered and the filtrate evaporated to a foam. This was treated with warm water (20 ml.) to give a solution which rapidly deposited crystals of 5,6-O-isopropylidene-5-cyano-3-methyl-1-β-D-glucofuranosyluracil (6.7 g.) which recrystallised from ethanol as plates, M.P. 233–234°.

This isopropylidene derivative (0.43 g.) was heated on a steam bath with 30% aqueous acetic acid (5 ml.) for 30 min. and the solution then evaporated to a solid which was crystallised from ethanol to yield needles of 5-cyano-3-methyl-1-β-D-glucofuranosyluracil (0.3 g.), M.P. 207–208°.

EXAMPLE XII (a) 2,3-O-isopropylidene - β - D - ribofuranosylamine p-toluenesulphonate (1.8 g.), p-nitrophenylhippurate (1.5 g.), triethylamine (0.5 g.) and acetonitrile (20 ml.) were mixed and set aside at room temperature for 2 days, water (50 ml.) added and the mixture shaken with Bio-rad AG1 8x OH⁻ resin until the yellow solution had become colourless. Evaporation gave a gum which was dissolved in chloroform, the extract washed with aqueous sodium chloride, dried and evaporated to a gum. N-hippuroyl-2,3-O-isopropylidene-β-D-ribofuranosylamine crystallised from methanol as needles, M.P. 161–163°, $(\alpha)_D^{20°}$—61° (c., 0.2% in dimethylsulphoxide).

(b) 2,3-O-isopropylidene - β - D - ribofuranosylamine p-toluenesulphonate (1.8 g.), phenyloxazolone (0.8 g.), triethylamine (0.5 g.) and acetonitrile (20 ml.) were left at room temperature overnight. The mixture was evaporated and the residue dissolved in chloroform (20 ml.), the solution washed with salt solution, dried and evaporated. N-hippuroyl-2,3-O-isopropylidene - β - D - ribofuranosylamine (0.6 g.) crystallised from methanol, M.P. 161–3°.

What we claim is:

1. An acid addition salt of a mono-alkylidenefuranosylamine of the formula:

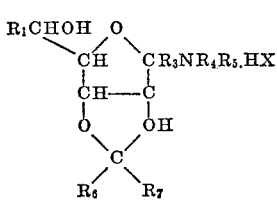

wherein $R_1$ represents hydrogen or methyl, $R_3$ represents hydrogen or hydroxymethyl, $R_4$ and $R_5$ represent hydrogen or lower alkyl, $R_6$ and $R_7$, which may be the same or different, each represent hydrogen, lower alkyl or phenyl and X is chloride, sulphate or p-toluenesulphonate.

2. A compound according to claim 1, which compound is 2,3-O-isopropylidene-β-D-ribofuranosylamine.

3. A compound according to claim 1, which compound is 2,3-O-isopropylidene-α-L-rhamnofuranosylamine.

4. An acid addition salt of a mono-alkylidenefuranosylamine of the formula:

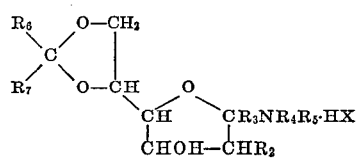

wherein $R_2$ represents hydrogen, amino or hydroxy, $R_3$ represents hydrogen or hydroxymethyl, $R_4$ and $R_5$ represent hydrogen or lower alkyl, $R_6$ and $R_7$, which may be the same or different, each represent hydrogen, lower alkyl or phenyl and X is chloride, sulphate or p-toluenesulphonate.

5. A compound according to claim 4, which compound is 5,6-O-isopropylidene-β-D-glucofuranosylamine.

6. An acid addition salt of a dialkylidenefuranosylamine of the formula:

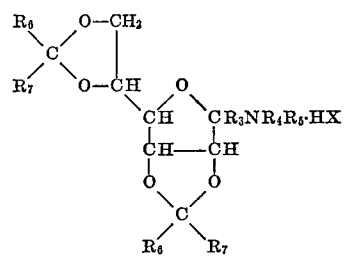

wherein $R_3$ represents hydrogen or hydroxymethyl, $R_4$ and $R_5$ represent hydrogen or lower alkyl, $R_6$ and $R_7$, which may be the same or different, each represent hydrogen, lower alkyl or phenyl and X is chloride, sulphate or p-toluenesulphonate.

7. A compound according to claim 6, which compound is 2,3-O-5,6-O-diisopropylidene - α - D-mannofuranosylamine.

8. An acid addition salt of a mono-alkylidenefuranosylamine of the formula:

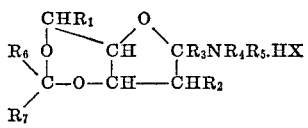

wherein $R_1$ represents hydrogen or methyl, $R_2$ represents hydrogen or hydroxyl, $R_3$ represents hydrogen or hydroxymethyl, $R_4$ and $R_5$ represent hydrogen or lower alkyl, $R_6$ and $R_7$, which may be the same or different, each represent hydrogen, lower alkyl or phenyl and X is chloride, sulphate or p-toluenesulphonate.

9. A compound according to claim 8, which compound is 3,5-O-isopropylidene-β-D-xylofuranosylamine.

10. A process of preparing mono- and di-alkylidenefuranosylamines by the reaction of a pyranosylamine of the formula:

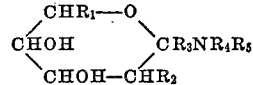

wherein $R_1$ represents hydrogen, methyl or hydroxymethyl; $R_2$ represents hydrogen, amino or hydroxyl; $R_3$ represents hydrogen or hydroxymethyl; and $R_4$ and $R_5$ represent hydrogen or lower alkyl but are preferably both hydrogen; and such that, in the furanose form, it possesses at least one pair of 1,2 *cis* or 1,3 *cis* hydroxyls, with a carbonyl compound of the formula:

wherein $R_6$ and $R_7$, which may be the same or different, each represent hydrogen, lower alkyl or phenyl or may together with the carbonyl group form an alicyclic ketone, in the presence of a sufficient strong acid to ensure that the amino group remains protonated.

11. An acid addition salt of a mono-alkylidenefuranosylamine of the formula:

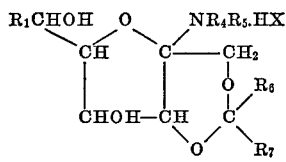

wherein $R_1$ represents hydrogen, methyl or hydroxymethyl, $R_4$ and $R_5$ represent hydrogen or lower alkyl, $R_6$ and $R_7$, which may be the same or different, each represent hydrogen, lower alkyl or phenyl and X is chloride, sulphate or p-toluenesulphonate.

12. An acid addition salt of a di-alkylidenefuranosylamine of the formula:

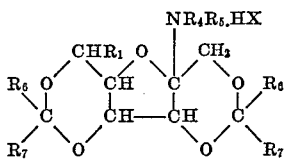

wherein $R_1$ represents hydrogen or methyl, $R_4$ and $R_5$ represent hydrogen or lower alkyl, $R_6$ and $R_7$, which may be the same or different, each represent hydrogen, lower alkyl or phenyl and X is chloride, sulphate or p-toluenesulphonate.

References Cited

UNITED STATES PATENTS

| | | | |
|---|---|---|---|
| 2,482,069 | 9/1949 | Ruskin | 260—211.5 |
| 2,996,449 | 8/1961 | Hodge et al. | 260—211.5 |
| 3,346,562 | 10/1967 | Honjo et al. | 260—211.5 |
| 3,451,993 | 6/1969 | Goshima et al. | 260—211.5 |
| 3,592,808 | 7/1971 | Theander | 260—210 |
| 3,598,804 | 8/1971 | Hindley et al. | 260—210 |

FOREIGN PATENTS

| | | | |
|---|---|---|---|
| 458,216 | 7/1949 | Canada | 260—211.5 |

JOHNNIE R. BROWN, Primary Examiner

UNITED STATES PATENT OFFICE
CERTIFICATE OF CORRECTION

Patent No. 3,816,399                    Dated June 11, 1974

Inventor(s) Gordon Shaw and Noel James Cusack

It is certified that error appears in the above-identified patent and that said Letters Patent are hereby corrected as shown below:

Column 3, lines 27-30, Formula XI,

Column 7, lines 56-64, the formula

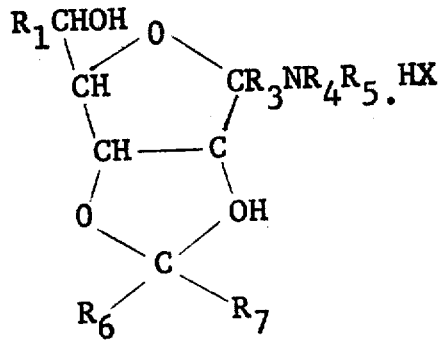   should read   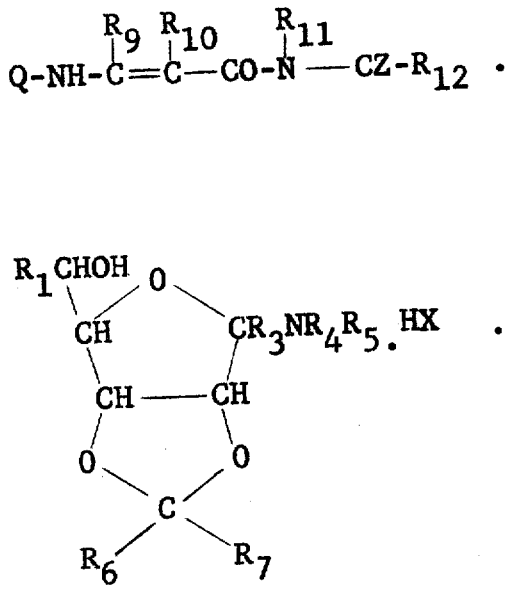

Signed and sealed this 5th day of November 1974.

(SEAL)
Attest:

McCOY M. GIBSON JR.
Attesting Officer

C. MARSHALL DANN
Commissioner of Patents